United States Patent [19]
Morita

[11] Patent Number: 5,069,081
[45] Date of Patent: Dec. 3, 1991

[54] MULTI-MODE SPLINED BALL SCREW ASSEMBLY

[75] Inventor: Kunihiko Morita, Koganei, Japan

[73] Assignee: Nippon Thompson Co., Ltd., Tokyo, Japan

[21] Appl. No.: 640,443

[22] Filed: Jan. 10, 1991

[30] Foreign Application Priority Data

Jan. 16, 1990 [JP] Japan .................. 2-2441[U]

[51] Int. Cl.$^5$ .................. F16H 29/20; F16H 1/20
[52] U.S. Cl. .................. 74/424 B; 74/89.15
[58] Field of Search .......... 74/424.8 B, 424.8 R, 74/89.15; 254/102

[56] References Cited

U.S. PATENT DOCUMENTS

| | | | |
|---|---|---|---|
| 1,420,113 | 6/1922 | Kuehn et al. | 254/102 |
| 2,298,717 | 10/1942 | Nardone | 74/89.15 X |
| 3,046,808 | 7/1962 | Demart | 74/89.15 X |
| 3,404,580 | 10/1968 | Valenti | 74/424.8 R |
| 3,640,147 | 2/1972 | Fantoni | 74/424.8 R |
| 4,000,661 | 1/1977 | Menzel | 74/89.15 |
| 4,685,344 | 8/1987 | Horn et al. | 74/424.8 R X |

FOREIGN PATENT DOCUMENTS

| | | | |
|---|---|---|---|
| 386809 | 4/1965 | Switzerland | 74/424.8 R |
| 1104102 | 7/1984 | U.S.S.R. | 254/102 |
| 2179913 | 3/1987 | United Kingdom | 254/102 |

Primary Examiner—Allan D. Herrmann
Assistant Examiner—Julie Krolikowski
Attorney, Agent, or Firm—Skjerven, Morrill, MacPherson, Franklin & Friel

[57] ABSTRACT

A multi-mode splined ball screw assembly includes a first shaft, a hollow second shaft and a hollow third shaft. The first shaft extends into the hollow second shaft and a ball spline structure is provided between the first and second shafts so that they may move relative to each other in the longitudinal direction. The second shaft extends into the third shaft and a ball screw structure is provided between the second and third shafts so that they may rotate relative to each other. The first shaft is rotatably supported by a housing and the third shaft has an outer peripheral surface, a part of which is defined as a ball spline surface section and another part of which is defined as a ball screw surface section. Another ball spline structure is provided between the housing and the ball spline surface section and another ball screw structure is provided between the housing and the ball screw surface section. Thus, the present assembly has a nested structure and can provide a number of different modes of operation.

3 Claims, 3 Drawing Sheets

MULTI-MODE SPLINED BALL SCREW ASSEMBLY

BACKGROUND OF THE INVENTION

1. Field of the Invention

This invention generally relates to a splined ball screw assembly including a spiral guide channel, which is defined between a pair of inner and outer members and provided with a plurality of balls, and also one or more axial guide channels provided with a plurality of balls so as to allow to provide a relative axial movement between the inner and outer members. More particularly, the present invention relates to a multi-mode splined ball screw assembly which can provide various modes of operation.

2. Description of the Prior Art

A typical prior art splined ball screw assembly is described in the U.S. Pat. No. 3,046,808 and its representative structure is illustrated in FIG. 3. As shown, the splined ball screw assembly generally includes a shaft A which is formed with a ball screw section B and a ball spline section C as located side-by-side in the axial direction of the shaft A. A spiral guide groove and a plurality of axial guide grooves are formed on the same portion of the shaft A. The assembly also includes a nut F which is fitted onto the shaft A with a predetermined gap therebetween and a plurality of balls partly engaged with the spiral guide groove of the shaft A and partly engaged with the spiral guide groove of the nut F. The assembly also includes an outer sleeve G which is located in the axial direction of the shaft A and which includes a plurality of endless guide passages filled with balls which are partly engaged with the respective axial guide grooves of the shaft when located at the load section of the endless guide passage.

With the above-described structure, when the nut F is driven to rotate in either direction through an associated drive gear train, the shaft A is caused to move in either direction along its axial direction without rotation through a spline engagement.

However, in the above-described prior art structure, since the ball screw section B and the ball spline section C are located in a side-by-side relationship in the axial direction, the overall axial length of the completed assembly tends to be large. Thus, there is a limit in making the overall assembly compact in size. In addition, since both of the spiral and axial guide grooves are formed on the same portion of the shaft, processing tends to be complicated and care and high precision are required in processing, so that a relatively long time of period is required and an advanced processing technology is required, which tends to push up the cost. In addition, with this prior art structure, the shaft A can move only in the axial direction and thus the mode of operation is rather limited, which tends to limit the scope of applications.

The inventor proposed an improved splined ball screw assembly and filed a patent application in the U.S.A. on Sept. 4, 1990, U.S. Ser. No. 577,354, claiming the Convention priority from the Japanese U.M. Application No. 1-104099. Although the this splined ball screw assembly is an improvement over the above-described prior art, there still exists room for further improvements, in particular in relation to the mode of operation.

SUMMARY OF THE INVENTION

In accordance with the present invention, there is provided a splined ball screw assembly comprising: a first shaft rotatably supported by a housing and having a spline outer peripheral surface; a second hollow shaft having an inner diameter large enough to allow said first shaft to be fitted therein and a ball screw outer peripheral surface; first engaging means fixedly attached to said second hollow shaft and engaged with the spline outer peripheral surface of the first shaft to thereby allow a relative axial movement between said first and second shafts; a third hollow shaft having an inner diameter large enough to allow said second shaft to be fitted therein and a spline outer peripheral surface section and a ball screw outer peripheral surface section; second engaging means fixedly attached to said third shaft and engaged with the ball screw outer peripheral surface of said second shaft to thereby allow a relative rotational motion between said second and third shafts; third engaging means fixedly supported by said housing and engaged with the ball spline outer peripheral surface section of said third shaft to thereby allow a relative rotational motion between said third shaft and said third engaging means; and fourth engaging means rotatably supported by said housing and engaged with the spline outer peripheral surface section of said third shaft to thereby allow a relative axial motion between said third shaft and said fourth engaging means.

Preferably, a first driving means is operatively coupled to the first shaft for driving to rotate the first shaft around its longitudinal axis. And, a second driving means is operatively coupled to the fourth engaging means for driving to rotate the fourth engaging means and thus the third shaft around its longitudinal axis. In an alternative structure, the third engaging means is rotatably supported by the housing and a third driving means is operatively coupled to the third driving means.

It is therefore a primary object of the present invention to provide an improved splined ball screw assembly compact in size, in particular in length, easy to manufacture and high in performance.

Another object of the present invention is to provide an improved splined ball screw assembly having an increased number of modes of operation, and thus an increased scope of applications.

A further object of the present invention is to provide an improved splined ball screw assembly which can provide a high precision positioning function.

Other objects, advantages and novel features of the present invention will become apparent from the following detailed description of the invention when considered in conjunction with the accompanying drawings.

DESCRIPTION OF THE PREFERRED EMBODIMENTS

Figure 1:
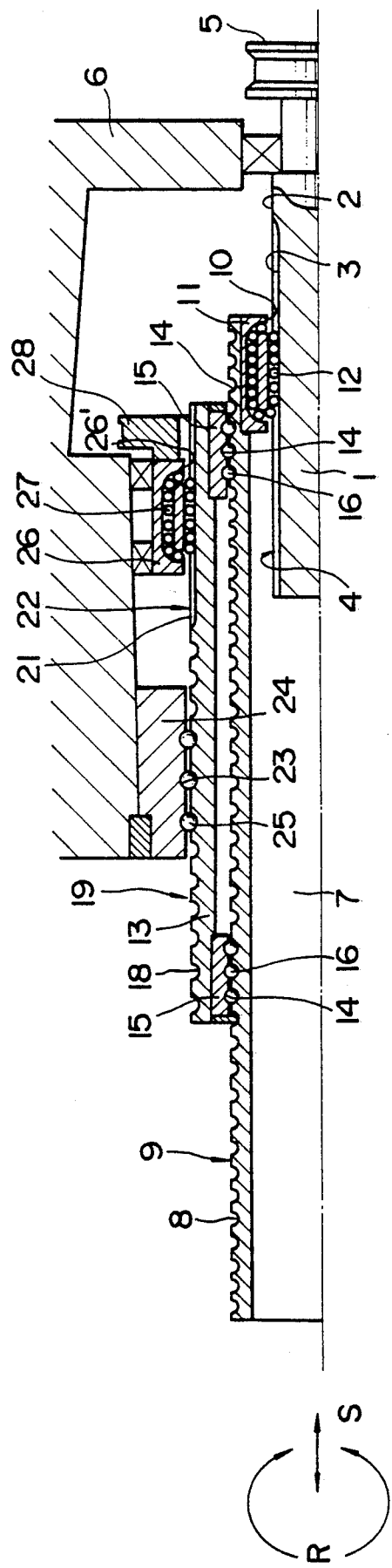
FIG. 1 is a schematic illustration showing in longitudinal cross section a splined ball screw assembly constructed in accordance with one embodiment of the present invention.

Referring now to FIG. 1, there is schematically shown in longitudinal cross section a splined ball screw assembly constructed in accordance with one embodiment of the present invention. As shown, the present assembly includes a ball spline shaft 1, which may be either hollow or solid, and its outer peripheral surface 2 is defined at least partly as a ball spline surface 4 which is provided with a plurality of axial guide grooves 3 extending straight in parallel with the center axis of the shaft 1. At one end of the shaft 1 is fixedly attached a pulley 5 which is operatively coupled to a drive source, such as a motor, through a belt (not shown). The shaft 1 is rotatably supported by a housing, for example, by means of a ball bearing.

The assembly also includes a ball screw shaft 7 which is hollow and which has an inner diameter large enough to allow the shaft 1 to be fitted therein. The ball screw shaft 7 is concentric with the shaft 1 and formed with a ball screw surface 9 provided with a spiral guide groove 8 defining a left-hand screw having a pitch Pb at its outer peripheral surface. A ball spline unit 11 including a plurality of endless circulating paths and a plurality of balls 12 provided in the paths is fixedly attached to the inner peripheral surface of the ball screw shaft 7 at its one end. Each of the plurality of endless circulating paths of the ball spline unit 11 has a load path section where the balls 12 are partly exposed and received in the corresponding one of the straight guide grooves of the ball spline surface 4. Thus, the ball screw shaft 7 may move in the axial direction relative to the ball spline shaft 1 through the ball spline unit 11.

Also provided in the present assembly is a ball screw and spline shaft 13 which is hollow and concentric with the ball screw shaft 7 and which has an inner diameter large enough to allow the ball screw shaft 7 to be fitted therein. A ball screw nut 15 is fixedly attached to each end of the ball screw and spline shaft 13 at its inner peripheral surface. The ball screw nut 15 is formed with a spiral guide groove 14 defining a left-hand screw having a pitch Pb opposite to the ball screw surface 9 of the ball screw shaft 7. And a plurality of balls 16 are provided as partly received in the spiral guide groove 14 of the ball screw nut 15 and in the spiral guide groove 8 of the ball screw shaft 7. Accordingly, a relative rotation may be provided between the ball screw shaft 7 and the ball screw and spline shaft 13, whereby the ball screw shaft 7 may move in the axial direction relative to the ball screw and spline shaft 13.

The ball screw and spline shaft 13 has an outer peripheral surface which includes a ball screw surface 19 provided with a spiral guide groove 18 defining a right-hand screw having a pitch Pa and a ball spline surface 22 provided with a plurality of axial guide grooves 21 extending straight in parallel with the center axis of the assembly. In addition, a ball screw nut 24 having a spiral guide groove 23 located opposite to the ball screw surface 19 of the ball screw and spline shaft 13 is fixedly mounted on the housing 6, and a plurality of balls 25 are provided in a channel defined between the spiral guide groove 23 of the ball screw nut 24 and the spiral guide groove 18 of the ball screw and spline shaft 13 so that the ball screw and spline shaft 13 is supported to be rotatable and axially movable relative to the ball screw nut 24. On the other hand, a ball spline unit 26 is rotatably supported by the housing 6, for example, by means of a ball bearing, and the ball spline unit 26 includes a plurality of endless circulating paths and a plurality of balls 27 provided in the paths. Each of the plurality of endless circulating paths includes a load path section 26' where the balls 27 are partly exposed outside of the path to be partly received in the corresponding one of the axial guide grooves 21 of the ball spline surface 22. Thus, the ball screw and spline shaft 13 is supported to be movable in the axial direction relative to the ball spline unit 26 without relative rotation therebetween. A pulley 28 is fixedly attached to the ball spline unit 26 and the pulley 28 is operatively coupled to a second drive source, such as a motor (not shown). Thus, a rotational force may be transmitted to the ball screw and spline shaft 13 through the ball spline unit 26 and the pulley 28.

It is to be noted that the spiral guide groove 8 of the ball screw surface 9 should not be limited to a left-hand screw having a pitch Pb, and it may be also defined as a right-hand screw. Similarly, the spiral guide groove 14 defining a right-hand screw having a pitch Pa formed on the ball screw surface 19 should not be limited to a right-hand screw, and it may be defined as a left-hand screw. However, the spiral guide grooves 8 and 14 should have the same spiral direction, either left-hand screw or right-hand screw. In addition, pitches Pa and Pb should be different, e.g., Pa being larger than Pb, so that an axial movement of the ball screw shaft 7 when serving as an output shaft may be controlled by a difference between pitches Pa and Pb. It should also be noted that the direction of rotation of each of the pulleys 5 and 28 can be controlled independently, for example, by a stepping motor or the like.

Now, various modes of operation of the above-described embodiment will be described below. The direction of rotation R of each of the pulleys 5 and 28 will be said to be normal if it rotates clockwise when looked from the pulley side and reversed if it rotates counterclockwise. The direction of axial motion S of the ball screw shaft 7, which serves as an output shaft, will be said to be forward when it moves to the left in the drawing and backward when it moves to the right.

In the first mode of operation, the pulley 28 is driven to rotate in the normal direction while keeping the pulley 5 non-rotational. Under the condition, the ball screw and spline shaft 13 having a right-hand screw rotates and moves in the forward direction through the ball spline unit 26 and the ball nut 24. In this case, the ball screw nuts 15 are set in rotation, but the ball screw shaft 7 of a left-hand screw is prevented from being set in rotation through engagement with the ball spline unit 11 and instead is caused to move axially in the forward direction depending on a difference between pitch Pa of shaft 13 and pitch Pb of shaft 7.

In the second mode of operation, both of pulleys 5 and 28 are set in rotation in the normal direction with the same number of steps. Under the condition, the ball screw shaft 7 moves in the forward direction over the same amount as that of the ball screw nut 15 through the actions of the left-hand and right-hand screws of the ball screw and spline shaft 13 and the ball screw shaft 7, so that both of the ball screw and spline shaft 13 and the ball screw shaft 7 move in the forward direction with rotation.

In the third mode of operation, the input side pulley 5 is set in rotation in the normal direction while keeping the pulley 28 not in rotation. Under this condition, the ball screw and spline shaft 13 remains stationary and only the ball screw shaft 7 moves in the backward direction with rotation in the normal direction through the action of a left-hand screw. In the fourth mode of operation, the pulley 28 is set in rotation in the reversed direction while keeping the pulley 5 non-rotational. Under this condition, the ball screw and spline shaft 13 moves in the backward direction with rotation in the reversed direction, and, similarly with the first mode of operation, the ball screw shaft 7 of a left-hand screw does not rotate but moves in the backward direction at a rate of a pitch difference between Pa and Pb due to the rotation of the ball screw nut 15.

In the fifth mode of operation, which is just the opposite of the second mode of operation, both of the pulleys 5 and 28 are set in rotation in the reversed direction. Under this condition, both of the ball screw and spline shaft 13 and the ball screw shaft 7 are set in rotation in the reversed direction, so that both of the ball screw and spline shaft 13 and the ball screw shaft 7 move in the backward direction with rotation in the reversed direction through the actions of left-hand and right-hand screws. In the six mode of operation, which is just the opposite of the third mode of operation, the pulley 5 is set in rotation in the reversed direction while keeping the pulley 28 non-rotational. Under this condition, the ball screw and spline shaft 13 remains stationary and only the ball screw shaft 7 moves in the forward direction with rotation in the reversed direction.

In the seventh mode of operation, the pulley 5 is set in rotation in the reversed direction and the pulley 28 is set in rotation in the normal direction. In this case, the ball screw and spline shaft 13 moves in the forward direction with rotation in the normal direction, whereas the ball screw shaft 7 moves in the forward direction with rotation in the reversed direction at an accelerated speed determined by a sum of pitches Pa and Pb through the movements in the forward direction with rotation in the reversed direction of the ball screw nut 15 of a left-hand screw mounted on the shaft 13 and the ball screw shaft 7 of a left-hand screw. In the eighth mode of operation, the pulley 5 is set in rotation in the normal direction and the pulley 28 is set in rotation in the reversed direction. In this case, the ball screw shaft 7 moves in the backward direction with rotation in the normal direction and the ball screw and spline shaft 13 moves in the backward direction with rotation in the reversed direction. The shaft 7 in this case moves in the backward direction with rotation in the normal direction at an accelerated speed defined by a sum of pitches Pa and Pb.

Figure 2:
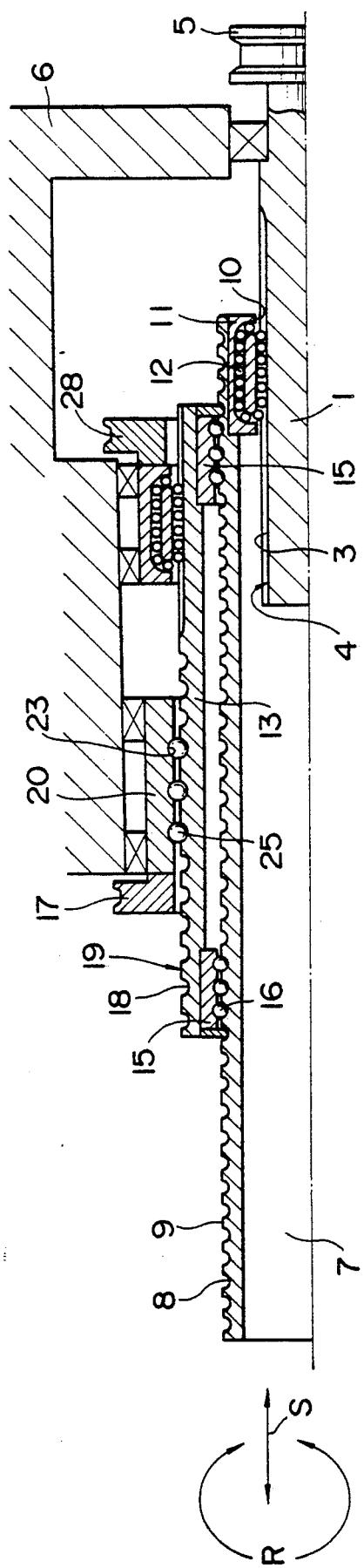
FIG. 2 is a schematic illustration showing in longitudinal cross section a splined ball screw assembly constructed in accordance with another embodiment of the present invention.
Figure 3:
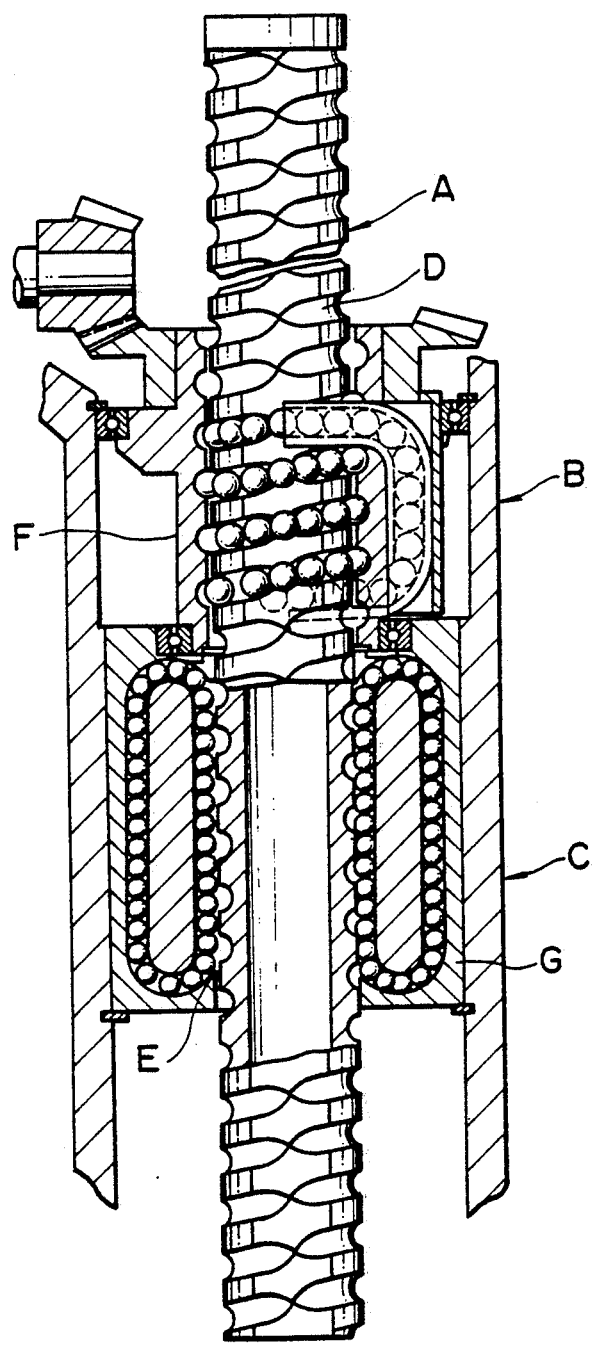
FIG. 3 is a schematic illustration showing a typical prior art splined ball screw assembly described in the U.S. Pat. No. 3,046,808.

FIG. 2 illustrates another embodiment of the present invention, in which a ball screw nut 20 is rotatably supported at the left-hand side of the housing 6 by means of a pair of ball bearings and a further pulley 17 is fixedly attached to the ball screw nut 20. It is to be understood that the pulley 17 is also operatively coupled to a third driving source, such as a motor. The ball screw nut 20 is provided with a spiral guide groove 23 which is located opposite to the ball screw surface 19 of the ball screw and spline shaft 13 with a plurality of balls 25 interposed between the spiral guide groove 23 and the spiral guide groove 18. Thus, the ball screw nut 20 supports the ball screw and spline shaft 13 rotatably and movable either in the forward or backward direction. The remaining structure of the assembly shown in FIG. 2 is substantially the same as that of the first embodiment shown in FIG. 1. Accordingly, this embodiment has all of the modes of operation of the first embodiment shown in FIG. 1 and also additional modes of operation established by rotating the pulley 17 in a desired direction. For example, when the pulley 17 is set in rotation while keeping the pulley 28 non-rotational, the ball screw and spline shaft 13 moves either in the forward or backward direction without rotation. Therefore, in this alternative embodiment, more precise control in operation can be provided in each of the modes of operation.

As described above, in accordance with the present invention, various guide grooves are provided at separate portions of shafts, so that processing can be carried out with extreme ease and at high accuracy. In addition, various modes of operation can be established with ease and at high precision. Besides, since the shafts are nested, the overall structure can be made compact in size, in particular in length.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A splined ball screw assembly comprising:
   a first shaft rotatably supported by a housing and having a spline outer peripheral surface;
   a second hollow shaft having an inner diameter large enough to allow said first shaft to be fitted therein and a ball screw outer peripheral surface;
   first engaging means fixedly attached to said second hollow shaft and engaged with the spline outer peripheral surface of the first shaft to thereby allow a relative axial movement between said first and second shafts;
   a third hollow shaft having an inner diameter large enough to allow said second shaft to be fitted therein and a spline outer peripheral surface section and a ball screw outer peripheral surface section;
   second engaging means fixedly attached to said third shaft and engaged with the ball screw outer peripheral surface of said second shaft to thereby allow a relative rotational motion between said second and third shafts;
   third engaging means fixedly supported by said housing and engaged with the ball spline outer peripheral surface section of said third shaft to thereby allow a relative rotational motion between said third shaft and said third engaging means; and
   fourth engaging means rotatably supported by said housing and engaged with the spline outer peripheral surface section of said third shaft to thereby allow a relative axial motion between said third shaft and said fourth engaging means.

2. The assembly of claim 1, wherein said first engaging means is operatively coupled to a first drive source and said fourth engaging means is operatively coupled to a second drive source.

3. The assembly of claim 2, wherein said third engaging means is rotatably supported by said housing and said third engaging means is operatively coupled to a third drive source.

* * * * *